Patented Jan. 13, 1942

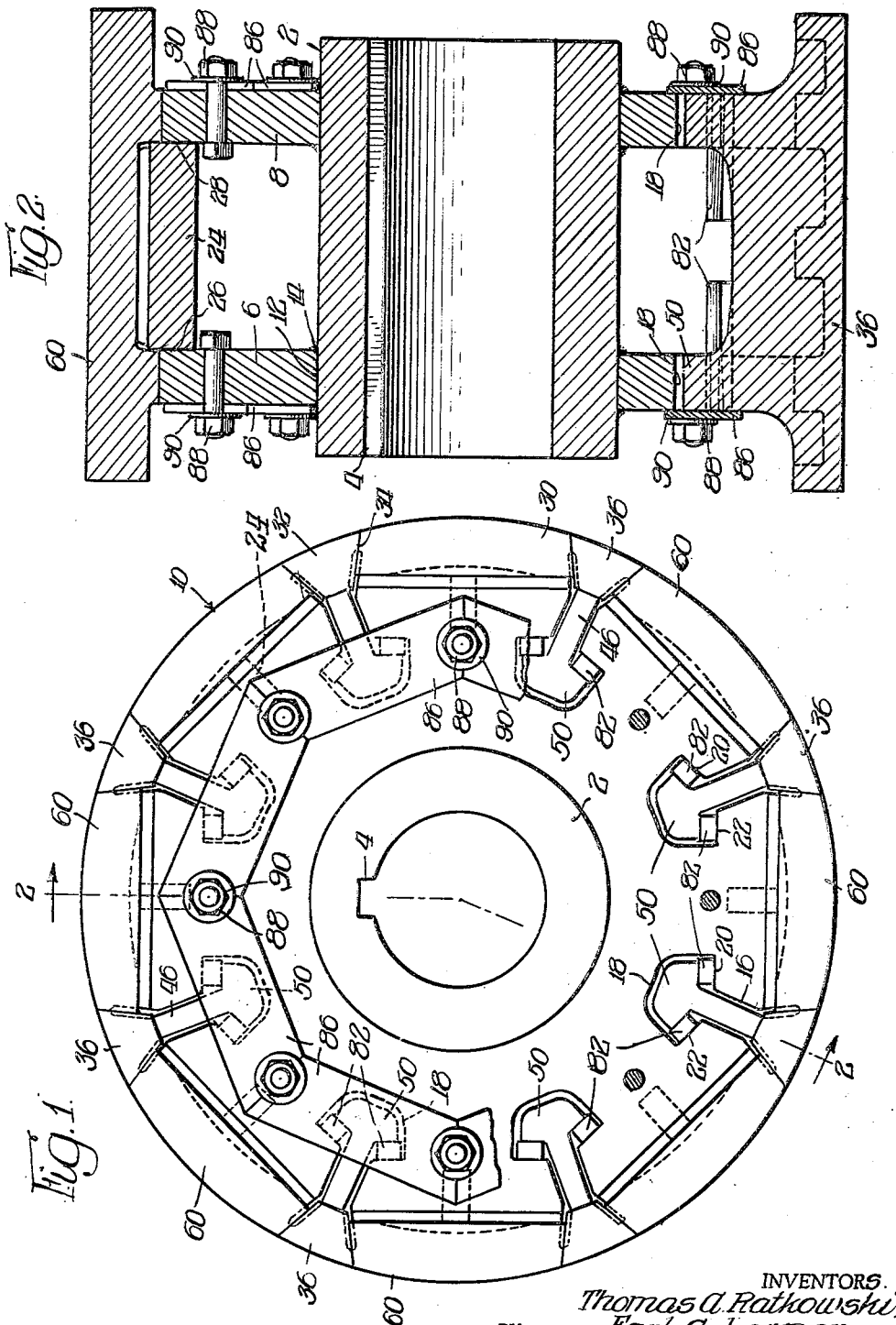

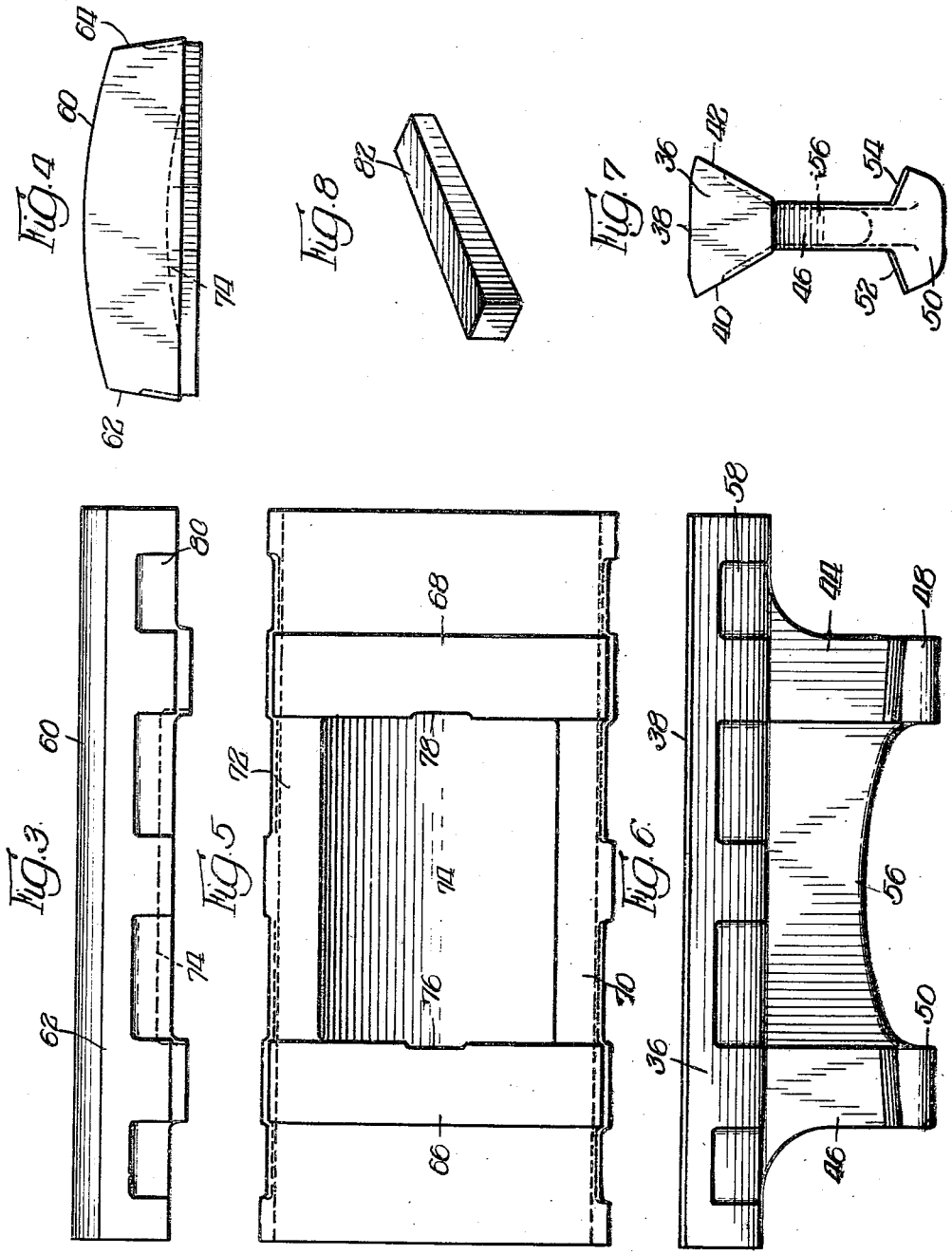

2,269,552

UNITED STATES PATENT OFFICE 2,269,552

SEGMENTAL CRUSHING ROLL

Thomas A. Ratkowski and Earl A. Lerner, Chicago Heights, Ill., assignors to The American Brake Shoe and Foundry Company, New York, N. Y., a corporation of Delaware Application August 7, 1939, Serial No. 288,780

8 Claims. (Cl. 83—12)

The present invention relates to roll constructions and more particularly to crushing rolls adapted for use in crushing rocks, ore, coal and the like.

Among the objects of the present invention is to provide a novel crushing roll embodying as characteristic features of its construction a plurality of parts particularly adapted in their construction to facilitate the manufacture thereof in quantity at a relatively low cost.

The invention in its broadest aspects involves the idea of providing a novel construction for a crushing roll constituted by a plurality of wearing parts so constructed and arranged as to facilitate replacement or repair to any one or more, when necessary, with ease and facility, or the assembly or disassembly of the completed structure in certain environments where space is a factor, such as usually experienced in equipment in which the said crushing rolls are used. More particularly, one of the distinct advantages of a crushing roll made in accordance with the present invention is in the arrangement of the working parts thereof including a roll shell which is constructed of a plurality of parts suitably secured in operative association with the roll body, yet involving an arrangement whereby the said parts, or any of them, may be readily and easily removed, replaced or repaired when such becomes necessary.

Still a further object within the purview of the present invention is to provide a novel roll construction wherein the multi-part shell and roll support are so constructed and arranged with respect to one another that displacement or movement circumferentially of one with respect to the other is prevented and the parts maintained in tight operative association at all times. More particularly, such novel results are accomplished by the formation of the roll body or shell supporting means of polygonal shape wherein parts or members of the shell are in intimate contact with the sides of the polygon, thus preventing this relative circumferential movement between the parts of the roll. As further illustrative of novel characteristics embodied in the present roll construction, the shell is constituted by alternately arranged segments and segment wedges, the segment wedges being disposed at the apices of the polygonal roll support and being suitably secured to said support in wedging relation to the segments for holding the shell in operative relation to the roll body.

As a still further advantage inherently possessed by the present novel roll construction, the segment wedges for the multi-part shell construction are provided with novel securing means adapted to cooperate with suitable means of the roll body whereby the same are drawn radially inwardly to effect the proper connection between the shell and the roll body. In the illustrative embodiment exemplifying the present invention, such securing means is constituted by opposed abutments formed on the roll body and segment wedges which cooperate with adjustable means in wedging relation thereto for effecting the desired adjustment of the said segment wedges in their respective wedging relation to adjacent segments of the multi-part roll shell.

Still a further object of the present invention is to provide a novel and simplified arrangement for holding the segments of the roll shell against axial displacement in their cooperative relation with the segment wedges which hold the entire shell in operative association with the roll body.

Still a further object of the present invention particularly related to multi-part roll shell constructions formed of manganese steel is to provide recesses between adjacent cooperating parts or elements of the roll shell whereby circumferential enlargement of the shell due to peening action is amply provided for to prevent the setting up of internal stresses and strains which might otherwise materially affect the life of these roll constructions.

Other objects, features, capabilities and advantages are comprehended by the invention, as will later appear and as are inherently possessed thereby.

Referring to the drawings:

Figure 1 is a view in end elevation with parts broken away of a crusher roll made in accordance with the present invention;

Figure 2 is a view in cross section taken in the plane represented by line 2—2 of Figure 1 of the drawings;

Figure 3 is a view in side elevation of the roll segment shown in Figure 1 of the drawings;

Figure 4 is a view in end elevation of the roll segment of Figure 3 of the drawings;

Figure 5 is a bottom plan view of the roll segment of Figure 3 of the drawings;

Figure 6 is a view in side elevation of a segment wedge shown in Figure 1 of the drawings;

Figure 7 is a view in end elevation of the segment wedge of Figure 6 of the drawings; and Figure 8 is a view in perspective of one of the wedge bars used in the roll construction of Figure 1 of the drawings.

Referring now more in detail to the drawings, a crusher roll illustrating the present invention is shown in the figures as including the hub 2 adapted to mount the roll upon a shaft or the like, said hub being provided with the keyway 4 adapted to receive a key for preventing relative rotational movement between the roll and the shaft upon which the same is mounted. Disposed in axially spaced relation and extending radially with respect to the hub 2 are side plate members 6 and 8 constituting spiders for support of the roll shell, generally referred to as 10, upon the hub 2, these plate members having centrally disposed openings such as 12 adapted to closely fit the hub 2, these members being secured to the hubs by way of suitable weld joints such as 14.

The side plates 6 and 8 constituting the connection between the hub 2 and shell 10 are polygonal shaped, having eight sides forming the periphery thereof and at each apex of which is a radially inwardly disposed opening or slot 16 merging in spaced relation to the adjacent sides into an enlarged part 18 forming laterally disposed abutments 20 and 22. Intermediate the apices of the polygonal shaped spiders 6 and 8 are the spacer bars 24 welded to the said spiders as at 26 and 28 and having the upper edge thereof disposed above the outer adjacent sides of the plates 6 and 8 for a purpose to be hereinafter more fully described. These spacer bars or ribs constitute reinforcing means for holding the plates 6 and 8 together at their periphery to prevent rupture of the weld joints 14 or any tipping which might take place between the same and the hub 2 during the crushing operations of the said roll and to prevent side movement of the segments 30 hereinafter described.

The roll shell 10 is constituted by a plurality of parts and more particularly by alternately arranged roll segments and roll segment wedges 30 and 32, respectively, which are in abutting relation through the cooperative wedge surfaces 34 and are held in such relation in association with the roll body by securing means to be later more fully described. It will be noted that the outer working surfaces of the segments and segment wedges are curved to provide a substantially continuous cylindrical roll surface, and that in the specific embodiment the said segments 30 are disposed along the sides of the polygonal shaped plates 6 and 8 with the segment wedges 32 disposed at the apices of said polygonal shaped roll body and in opposed relation to the said openings or slots 16.

By referring to Figures 6 and 7, it will be noted that said segment wedges are provided with a circumferential wedge part 36 formed with the working surface 38 and opposed wedge surfaces 40 and 42 and depending from which are the parts 44 and 46 formed with enlarged portions 48 and 50, respectively, providing the laterally disposed wedge abutments, such as 52 and 54, these parts 44 and 46 being secured together and reinforced as by way of the reinforcing web or member 56. The peripheral wedge part 36 is provided with a plurality of recesses, such as 58, formed in the wedge surfaces 40 and 42 for a purpose to be hereinafter more fully disclosed.

The construction for the roll segments 30 is more particularly shown in Figures 3, 4 and 5, the said segments comprising a member having the curved working surface 60 and side wedge surfaces 62 and 64, the said member on its under side in opposed relation to the working surface 60 being formed with ribs 66 and 68 which, together with the side elements 70 and 72, form a recess 74 adapted to receive a spacer bar 24 extending between and being received in notches 76 and 78 whereby the said roll segments are held against axial and circumferential displacement with respect to the said spiders 6 and 8. The wedge surfaces 62 and 64 are both provided with a plurality of recesses 80 complementary to and oppositely disposed with respect of recesses 58 of the segment wedges 32, which recesses provide a spacing between the said segments and segment wedges adapted to accommodate circumferential enlargement which may take place in the shell 10 due to peening, particularly when the said shell members are formed of manganese steel.

The shell assembly is retained in position upon the roll body by way of the segment wedges through parts 44 and 46 which are in the form of securing means received within the openings 16 of the said spiders 6 and 8. The connection is effected by way of the wedge bars 82 which are driven axially into position between the opposed wedge or inclined abutments 52 and 54 and the opposed laterally disposed abutments 20 and 22 when the said parts are received in the openings 16. These bars may be driven their full length flush with the outer faces of plates 6 and 8 or may be readily and easily cut by a torch or other means to have their ends in said flushed condition, after which the the same are securely held in wedging relation with the said abutments by means of a plurality of plates or securing members, such as 86. These plates have their ends in abutting relation and are secured to the spiders 6 and 8 by means of the securing bolts 88, a washer 90 being provided in overlapping relation to the adjacent ends of the abutting members 86 in order to prevent axial movement or displacement thereof with respect to the said wedge bars 82.

The crushing roll of the construction hereinabove described has distinct advantages over other types of construction of crushing rolls in that the various parts are easily fabricated and assembled as by way of weld joints, as disclosed. This multi-part construction is of particular advantage from the standpoint of cost, as well as assembly, where space limitations must be taken into account in that the various elements constituting the roll shell and the said roll or supporting body may be delivered separately to the point where assembly is desired, after which these parts may be put together as clearly disclosed and described herein. Further advantages are derived in the multi-part construction in that the various parts subjected to wear can be readily removed from assembled relation with the other parts for repair or replacement without necessitating the removal of the entire roll from its operative association with other elements of the apparatus with which the same is used. In addition to the above, the simplified arrangement for securing the various elements together facilitates replaceability for repair or substitution of the various parts, and further provides an effective manner for holding the working parts of the device in tight association with one another, thus preventing excessive wear thereto.

As an additional feature of construction, provision has been made to accommodate circumferential enlargement of the said parts of the roll shell due to peening, thus preventing undue stress and strain on the various parts when such takes place as is usual where manganese steel is used in the fabrication of the various parts.

While we have herein described and upon the drawings shown an illustrative embodiment of the invention, it is to be understood that the invention is not limited thereto but may comprehend other constructions, arrangements of parts, details and features without departing from the spirit of the invention.

We claim:

1. In a crushing roll or the like, the combination of a shell comprising a plurality of alternately arranged segments and segment wedges forming the working surface of said roll, means for supporting said shell comprising a plurality of radially extending and axially spaced supporting members having radially disposed openings merging with the periphery thereof and provided with a laterally disposed part forming an abutment, said segment wedges having securing means received in said openings and provided with laterally disposed parts forming an abutment disposed in opposed relation to said first-named abutment, and means in cooperative relation with said abutments for holding said wedges in place, said openings extending axially through said supporting members to permit said segment wedges to be withdrawn and inserted in an axial direction with respect to said supporting members.

2. In a crushing roll or the like, the combination of a hub, a plurality of axially spaced and radially extending shell supporting members, a shell comprising a plurality of alternately arranged segments and segment wedges in wedging relation to one another, means for interlocking said segments with respect to said supporting members to prevent axial displacement of said segments, said supporting members having peripheral openings provided with a laterally disposed part forming an abutment, said segment wedges having securing means provided with a laterally disposed abutment, and axially disposed means cooperating with said abutments for drawing said segment wedges radially into wedging relation to said segments, said openings extending axially through said supporting members to permit said segment wedges to be withdrawn and inserted in an axial direction with respect to said supporting members.

3. In a crushing roll or the like, the combination of a hub, a plurality of axially spaced and radially extending shell supporting members, a shell comprising a plurality of alternately arranged segments and segment wedges in wedging relation to one another, means for interlocking said segments with respect to said supporting members to prevent axial displacement of said segments, said supporting members having peripheral openings provided with a laterally disposed part forming an abutment, said segment wedges having securing means provided with a laterally disposed abutment, axially disposed means cooperating with said abutments for drawing said segment wedges radially into wedging relation to said segments, and means preventing axial displacement of said last-named means, said openings extending axially through said supporting members to permit said segment wedges to be withdrawn and inserted in an axial direction with respect to said supporting members.

4. In a crushing roll or the like, the combination of a hub, a plurality of axially spaced and radially extending shell supporting members, a shell comprising a plurality of alternately arranged segments and segment wedges in wedging relation to one another, ribs disposed between said supporting members and cooperating with said segments to prevent axial displacement thereof and said supporting members having peripheral openings provided with a laterally disposed part forming an abutment, said segment wedges having securing means provided with a laterally disposed abutment, and axially disposed means cooperating with said abutments for drawing said segment wedges radially into wedging relation to said segments, said openings extending axially through said supporting members to permit said segment wedges to be withdrawn and inserted in an axial direction with respect to said supporting members.

5. In a crushing roll or the like, the combination of a hub, a plurality of axially spaced and radially extending shell supporting members, a shell comprising a plurality of alternately arranged segments and segment wedges in wedging relation to one another, ribs disposed between said supporting members and cooperating with said segments to prevent axial displacement thereof, said supporting members having peripheral openings provided with a laterally disposed part forming an abutment, said segment wedges having securing means provided with a laterally disposed abutment, and axially disposed means cooperating with said abutments for drawing said segment wedges radially into wedging relation to said segments, and means preventing axial displacement of said last-named means, said openings extending axially through said supporting members to permit said segment wedges to be withdrawn and inserted in an axial direction with respect to said supporting members.

6. In a crushing roll or the like, the combination of a hub, shell supporting means of polygonal shape comprising a plurality of axially spaced and radially extending shell supporting members, a shell comprising a plurality of alternately arranged segments and segment wedges in wedging relation to one another, means intermediate the apices of said polygonal shell supporting members for interlocking said segments therewith, said supporting members at said apices having peripheral openings provided with a laterally disposed part forming an abutment, said segment wedges being disposed at said apices and having securing means received in said openings, said securing means having a laterally disposed part forming an abutment, axially disposed means cooperating with said abutments for drawing said segment wedges inwardly into wedging relation to said segments, and means for preventing axial displacement of said last-named means, said openings extending axially through said supporting members to permit said segment wedges to be withdrawn and inserted in an axial direction with respect to said supporting members.

7. A segment wedge for a crushing roll or the like, comprising a member having a part formed with a working surface and opposed wedge surfaces, spaced depending parts each formed with an enlarged head providing at least an abutment extending generally substantially normal to the radial plane of said wedge member and having a laterally disposed portion formed with a wedge surface, and a reinforcing member extending between said depending parts, said first-named wedge surfaces having recesses therein, said recesses being alternately spaced transversely through the width and extending inwardly from the side more than one-half of the depth of the wedge member, said wedge member characterized as being formed from metal having the property of flowability resulting in circumferential enlargement thereof, said recesses being of a depth sufficient to provide for a flowing of the metal incident to peening and extending from the inner surface radially and outwardly to substantially midpoint.

8. In a crushing roll or the like, the combination of shell supporting means, a shell comprising a plurality of segment and segment wedge members alternately arranged, each segment and segment wedge members having a working surface and opposed wedge surfaces, means for securing said members to said means, said members having their abutting surfaces formed with recesses, said recesses being alternately spaced transversely through the width and extending inwardly from the side more than one-half of the depth of the segmental member, said abutting members characterized as being formed from metal having the property of flowability resulting in circumferential enlargement thereof, said recesses being of a depth sufficient to provide for a flowing of the metal incident to peening and extending from the inner surface radially and outwardly to substantially midpoint.

THOMAS A. RATKOWSKI.
EARL A. LERNER.